(12) United States Patent
Natale

(10) Patent No.: US 10,667,506 B2
(45) Date of Patent: Jun. 2, 2020

(54) INSECT TRAP ASSEMBLY

(71) Applicant: Ralph Natale, Thorold (CA)

(72) Inventor: Ralph Natale, Thorold (CA)

( * ) Notice: Subject to any disclaimer, the term of this patent is extended or adjusted under 35 U.S.C. 154(b) by 214 days.

(21) Appl. No.: 15/861,985

(22) Filed: Jan. 4, 2018

(65) Prior Publication Data
US 2019/0200596 A1 Jul. 4, 2019

(51) Int. Cl.
| *A01M 1/04* | (2006.01) |
| *A01M 1/02* | (2006.01) |
| *A01M 1/14* | (2006.01) |
| *A01M 1/10* | (2006.01) |

(52) U.S. Cl.
CPC .............. *A01M 1/145* (2013.01); *A01M 1/02* (2013.01); *A01M 1/04* (2013.01); *A01M 1/106* (2013.01)

(58) Field of Classification Search
CPC ................................ A01M 1/145; A01M 1/04
USPC ...................................................... 43/113, 114
See application file for complete search history.

(56) References Cited

U.S. PATENT DOCUMENTS

| 511,689 | A | * | 12/1893 | Dodd | ................................ 43/131 |
| 628,494 | A | * | 7/1899 | Schriever | ................ A01M 1/14 43/115 |
| 751,970 | A | * | 2/1904 | Zierl | ........................ A01M 1/14 43/114 |
| 3,708,908 | A | * | 1/1973 | Levey | ...................... A01M 1/02 43/114 |
| 4,411,093 | A | | 10/1983 | Stout et al. | |
| 4,490,938 | A | * | 1/1985 | Baker | ...................... A01M 1/14 43/114 |
| 4,577,434 | A | * | 3/1986 | Davis | ..................... A01M 1/145 43/114 |
| 5,048,224 | A | * | 9/1991 | Frisch | ...................... A01M 1/02 43/107 |
| 5,203,816 | A | * | 4/1993 | Townsend | ............. A01M 1/145 43/113 |
| 6,108,966 | A | | 8/2000 | Otomo et al. | |
| 6,481,152 | B1 | | 11/2002 | Gray | |
| 6,966,142 | B1 | * | 11/2005 | Hogsette | ............. A01M 1/2005 43/107 |
| 7,143,542 | B2 | | 12/2006 | Taylor et al. | |
| D561,297 | S | | 2/2008 | Schneidmiller | |
| 8,800,198 | B2 | | 8/2014 | Frisch | |
| 9,968,080 | B1 | * | 5/2018 | Van Kleef | ............. A01M 1/145 |
| 10,412,953 | B2 | * | 9/2019 | Van Kleef | ............... F21V 15/01 |
| 2006/0248783 | A1 | | 11/2006 | Lindquist et al. | |
| 2009/0277074 | A1 | * | 11/2009 | Noronha | .................. A01M 1/08 43/113 |
| 2010/0236133 | A1 | * | 9/2010 | Frisch | .................... A01M 1/145 43/113 |
| 2011/0078943 | A1 | * | 4/2011 | Larsen | .................. A01M 1/145 43/113 |

(Continued)

FOREIGN PATENT DOCUMENTS

GB 2477806 A * 8/2011 .............. A01M 1/14

*Primary Examiner* — Christopher P Ellis

(57) ABSTRACT

An insect trap assembly for luring and trapping insects includes a tube that has an upper edge and a lower edge. The tube comprises a translucent material. An adhesive layer is positioned on an outer surface of the tube. The adhesive layer secures insects to the tube when the insects engage the adhesive layer. An illuminating member is mounted to the tube. The illuminating member illuminates the tube when the light emitter is turned on. The illuminating member is positioned in the tube.

10 Claims, 4 Drawing Sheets

(56) References Cited

U.S. PATENT DOCUMENTS

| | | | | |
|---|---|---|---|---|
| 2012/0167450 A1* | 7/2012 | Frisch | .................... | A01M 1/145 |
| | | | | 43/113 |
| 2012/0297662 A1* | 11/2012 | Strube | .................... | A01M 1/145 |
| | | | | 43/113 |
| 2013/0298444 A1* | 11/2013 | Strube | .................... | A01M 1/145 |
| | | | | 43/113 |
| 2013/0318854 A1* | 12/2013 | Zhang | .................... | A01M 1/145 |
| | | | | 43/2 |
| 2015/0020437 A1* | 1/2015 | Crawley | ............. | A01M 1/2016 |
| | | | | 43/113 |
| 2019/0141979 A1* | 5/2019 | Smith | .................... | A01M 1/145 |
| | | | | 43/114 |

\* cited by examiner

INSECT TRAP ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to insect population control devices and more particularly pertains to a new insect population control device for luring and trapping insects.

BRIEF SUMMARY OF THE INVENTION

An embodiment of the disclosure meets the needs presented above by generally comprising a tube that has an upper edge and a lower edge. The tube comprises a translucent material. An adhesive layer is positioned on an outer surface of the tube. The adhesive layer is configured to secure insects to the tube when the insects engage the adhesive layer. An illuminating member is mounted to the tube. The illuminating member illuminates the tube when the light emitter is turned on. The illuminating member is positioned in the tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
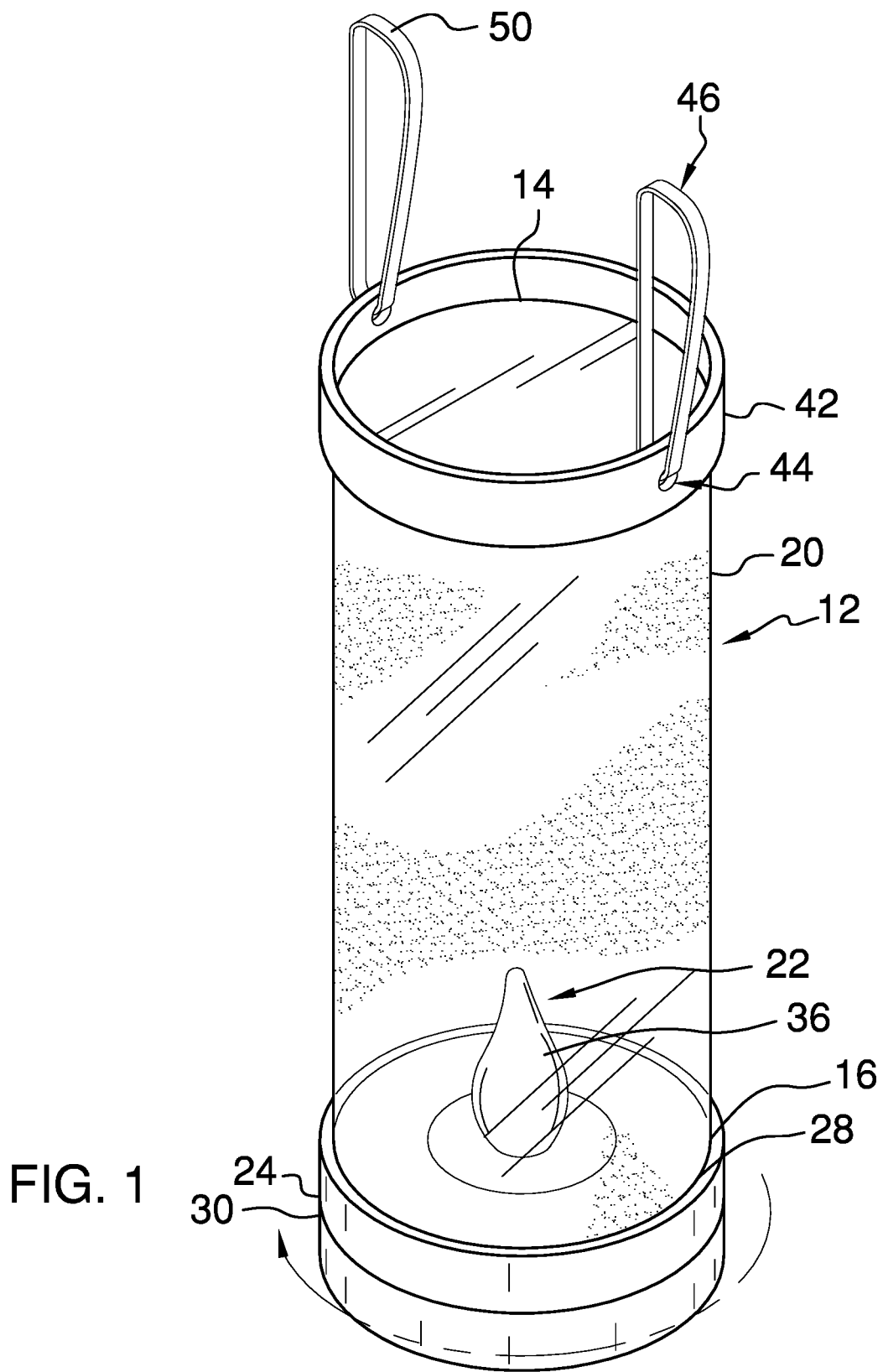
FIG. 1 is a top side view of an insect trap assembly according to an embodiment of the disclosure.
Figure 2:
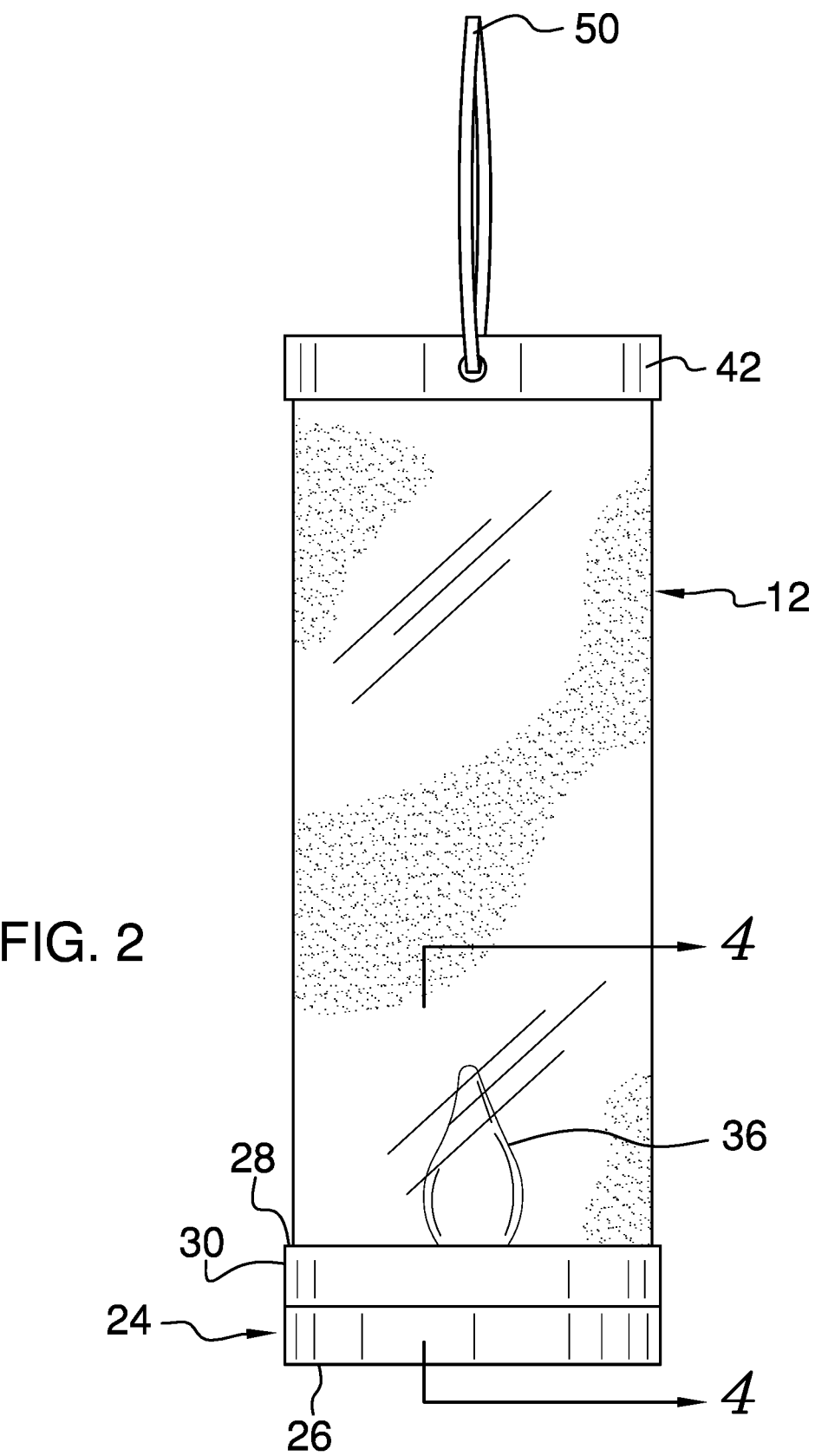
FIG. 2 is a side view of an embodiment of the disclosure.
Figure 3:
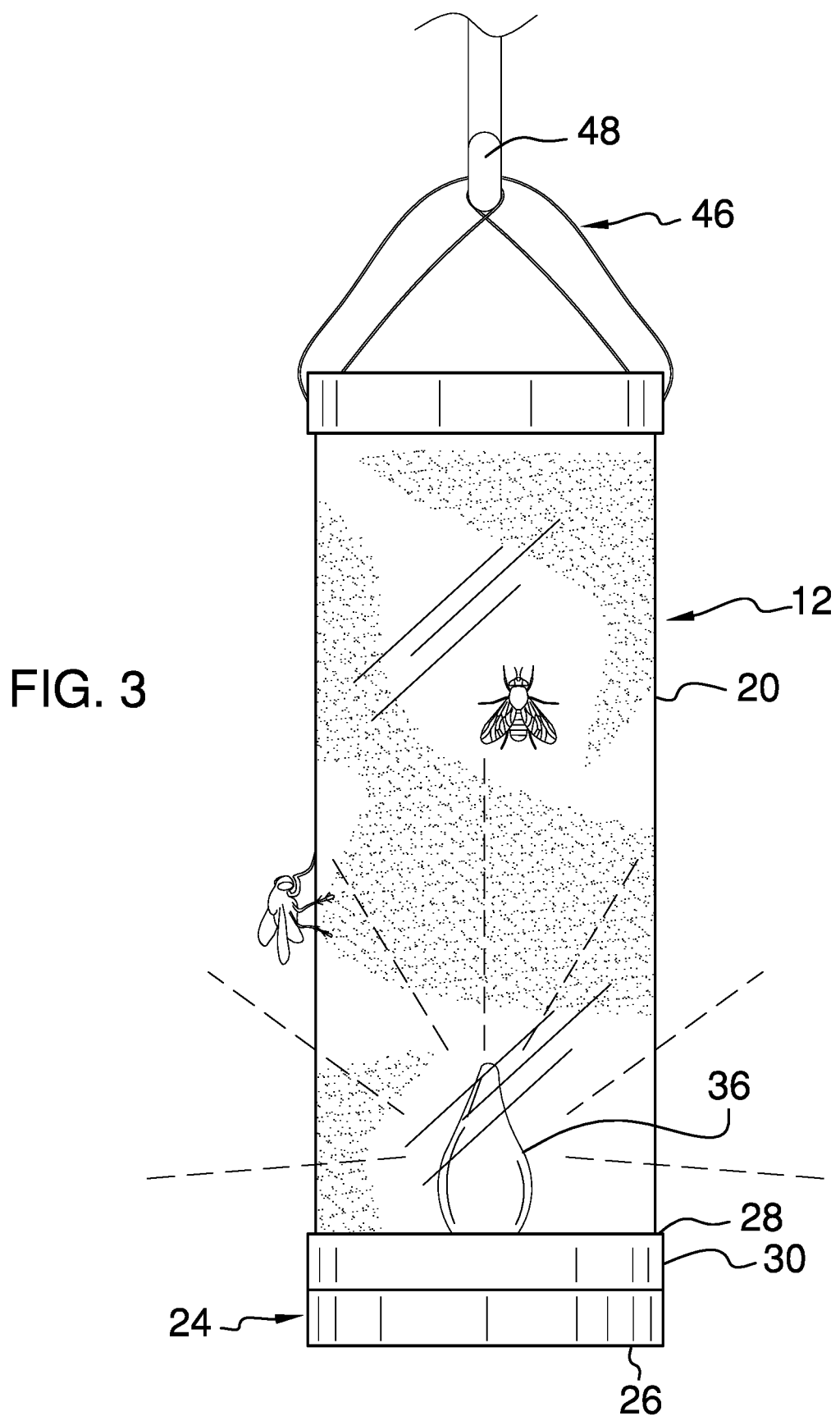
FIG. 3 is a side view of an embodiment of the disclosure.
Figure 4:
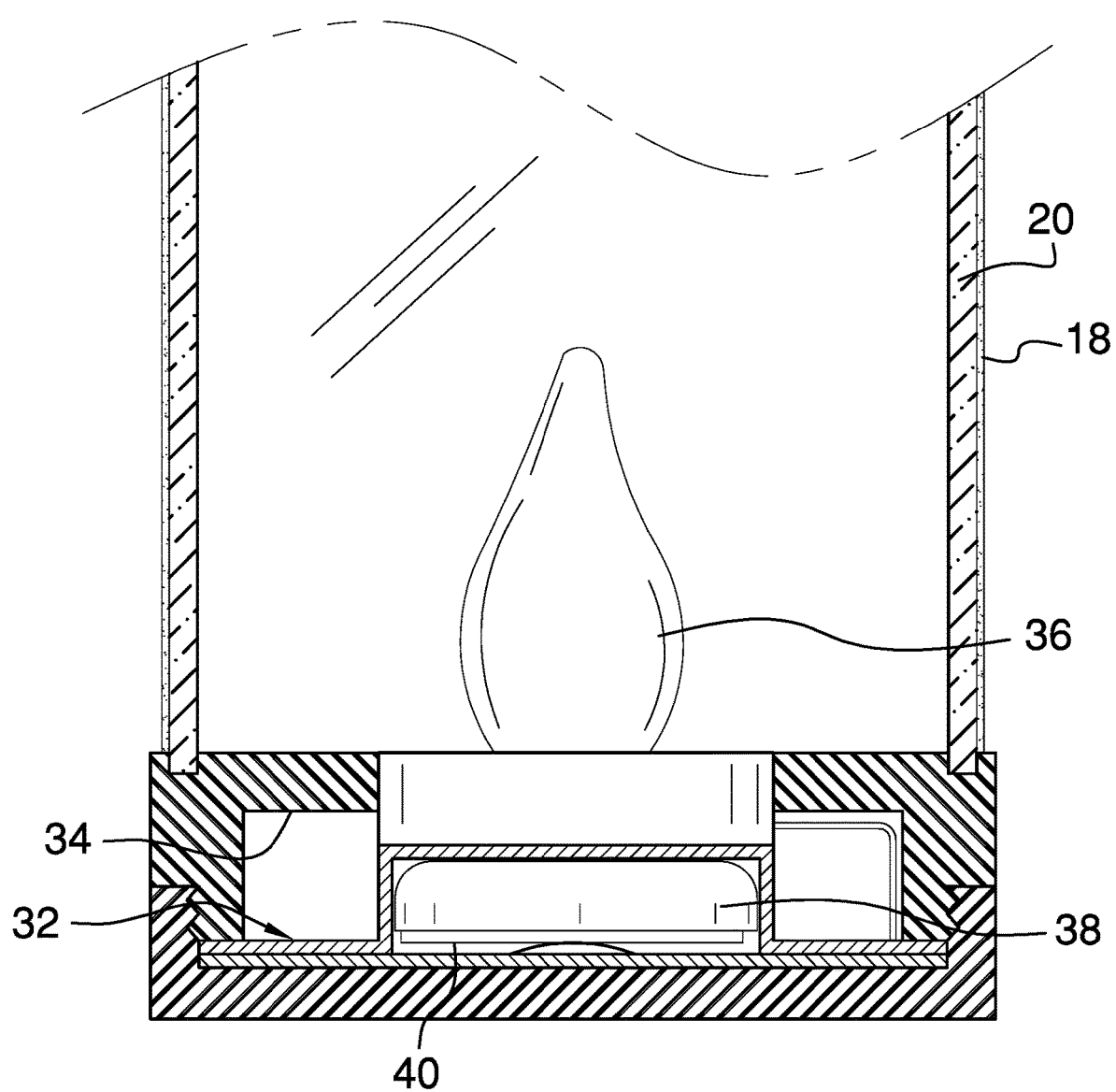
FIG. 4 is a cross-sectional view of an embodiment of the disclosure taken along line 4-4 of FIG. 2.

With reference now to the drawings, and in particular to FIGS. 1 through 4 thereof, a new insect population control device embodying the principles and concepts of an embodiment of the disclosure and generally designated by the reference numeral 10 will be described.

As best illustrated in FIGS. 1 through 4, the insect trap assembly 10 generally comprises a tube 12 that has an upper edge 14 and a lower edge 16. The tube 12 comprises a translucent material. An adhesive layer 18 is positioned on an outer surface 20 of the tube 12. The adhesive layer 18 substantially covers an entirety of the outer surface 20 of the tube 12. The adhesive layer 18 secures insects to the tube 12 when the insects engage the adhesive layer 18. Substantially, in this context, should be understood to mean that at least 80% of the outer surface 20 is covered with the adhesive layer 18.

An illuminating member 22 is mounted to the tube 12. The illuminating member 22 illuminates the tube 12 when the illuminating member 22 is turned on. The illuminating member 22 is positioned in the tube 12. The illuminating member 22 includes a housing 24 that has a bottom wall 26, a top wall 28 and a perimeter wall 30 that is attached to and extends between the top wall 28 and the bottom wall 26. The perimeter wall 30 has an opening 32 therein to access an interior 34 of the housing 24. The housing 24 is attached to the tube 12 adjacent to the lower edge 16. A light emitter 36 is mounted on the housing 24. The light emitter 36 emits a visible light when turned on. The light emitter 36 extends inward of the tube 12.

A power supply 38 is mounted in the housing 24 and is electrically coupled to the light emitter 36. The power supply 38 comprises at least one battery. The power supply 38 could include alternate powering means including being plugged into a traditional outlet, a rechargeable battery, or a solar cell mounted on the tube and electrically coupled to a rechargeable battery. An actuator 40 is electrically coupled to the power supply 38 and the light emitter 36. The actuator 40 is actuated to turn the light emitter 36 off or on.

A crown 42 is attached to the tube 12 adjacent to the upper edge 14. The crown 42 has a plurality of apertures 44 that extends therethrough. A mount 46 is attached to the tube 12 and engages a support 48 such that the tube 12 is suspended from the support 48. The mount 46 includes a strap 50 that is formed into a closed loop. The strap 50 extends through the apertures 44 in the crown. A fragrance is positioned on the tube 12 and attracts insects to the adhesive layer 18.

In use, the actuator 40 is actuated to turn the light emitter 36 on. The mount 46 is engaged to the support 48 such that the tube 12 is suspended from the support 48. Insects are then attracted to the visible light and the fragrance. Insects that fly toward the visible light and the fragrance engage the adhesive layer 18 and stick thereto.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An insect trapping assembly comprising:
    a tube having an upper edge and a lower edge, said upper edge defining an opening into said tube wherein said tube is configured to allow insects to enter and exit said tube through said opening, said tube comprising a translucent material;
    an adhesive layer being positioned on an outer surface of said tube, said adhesive layer being configured to secure the insects to said tube when the insects engage said adhesive layer; and
    an illuminating member being mounted to said tube, said illuminating member illuminating said tube when said illuminating member is turned on, said illuminating member being positioned in said tube.

2. The insect trapping assembly according to claim 1, wherein said adhesive layer substantially covers an entirety of said outer surface of said tube.

3. The insect trapping assembly according to claim 1, wherein said illuminating member includes:
    a housing having a bottom wall, a top wall and a perimeter wall being attached to and extending between said top wall and said bottom wall; and
    a light emitter being mounted on said housing, said lighting unit emitting a visible light when turned on, said light emitter extending inward of said tube.

4. The insect trapping assembly according to claim 3, further including a power supply being mounted in said housing and being electrically coupled to said light emitter.

5. The insect trapping assembly according to claim 4, wherein said power supply comprises at least one battery.

6. The insect trapping assembly according to claim 3, further including an actuator being electrically coupled to said power supply and said light emitter, said actuator being actuated to turn said light emitter off or on.

7. The insect trapping assembly according to claim 1, further including:
    a crown being attached to said tube adjacent to said upper edge, said crown having a plurality of apertures extending therethrough; and
    a mount being attached to said tube and being configured to engage a support such that said tube is suspended from said support, said mount including a strap being formed into a closed loop.

8. The insect trapping assembly according to claim 1, further including:
    a crown being attached to said tube adjacent to said upper edge, said crown being annular wherein said opening is uncovered by said crown such that said crown is configured to allow insects to enter and exit said tube through said opening; and
    a mount being attached to said tube and being configured to engage a support such that said tube is suspended from said support.

9. The insect trapping assembly according to claim 1, further including a fragrance being positioned on said tube and being configured to attract insects to said adhesive layer.

10. An insect trapping assembly comprising:
    a tube having an upper edge and a lower edge, said upper edge defining an opening into said tube wherein said tube is configured to allow insects to enter and exit said tube through said opening, said tube comprising a translucent material;
    an adhesive layer being positioned on an outer surface of said tube, said adhesive layer substantially covering an entirety of said outer surface of said tube, said adhesive layer being configured to secure the insects to said tube when the insects engage said adhesive layer;
    an illuminating member being mounted to said tube, said illuminating member illuminating said tube when said illuminating member is turned on, said illuminating member being positioned in said tube, said illuminating member including:
        a housing having a bottom wall, a top wall and a perimeter wall being attached to and extending between said top wall and said bottom wall, said perimeter wall having an opening therein for accessing an interior of said housing, said housing being attached to said tube adjacent to said lower edge;
        a light emitter being mounted on said housing, said lighting unit emitting a visible light when turned on, said light emitter extending inward of said tube;
        a power supply being mounted in said housing and being electrically coupled to said light emitter, said power supply comprising at least one battery;
        an actuator being electrically coupled to said power supply and said light emitter, said actuator being actuated to turn said light emitter off or on;
    a crown being attached to said tube adjacent to said upper edge, said crown having a plurality of apertures extending therethrough, said crown being annular wherein said opening is uncovered by said crown such that said crown is configured to allow insects to enter and exit said tube through said opening;
    a mount being attached to said tube and being configured to engage a support such that said tube is suspended from said support, said mount including a strap being formed into a closed loop, said strap extending through said apertures in said crown; and
    a fragrance being positioned on said tube and being configured to attract insects to said adhesive layer.

* * * * *